(12) United States Patent
Edwards et al.

(10) Patent No.: US 6,400,820 B1
(45) Date of Patent: Jun. 4, 2002

(54) JAVA ENABLED GROUPWARE

(75) Inventors: Michael John Edwards, Romsey; Amir Nathoo, Watford, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/291,243

(22) Filed: Apr. 13, 1999

(30) Foreign Application Priority Data

May 11, 1998 (GB) ............................................. 9809970

(51) Int. Cl.[7] ................................................ H04M 3/00
(52) U.S. Cl. ...................... 379/265.01; 379/900; 709/1
(58) Field of Search ...................... 379/265.01, 266.01, 379/900, 309; 709/310–332, 1

(56) References Cited

U.S. PATENT DOCUMENTS 6,141,724 A * 10/2000 Butler et al. .................. 717/11
6,144,991 A * 11/2000 England .................. 709/219 X
6,230,287 B1 * 5/2001 Pinard et al. ................ 379/265
6,295,551 B1 * 9/2001 Roberts et al. ............. 709/217

* cited by examiner

Primary Examiner—Creighton Smith
(74) Attorney, Agent, or Firm—Jerry W. Herndon

(57) ABSTRACT

A system for operating a call center comprising workstations and corresponding telephones connected to a telephony private branch switch. The system comprising: a telephony server, connected between the workstations and the telephony switch, for performing telephony functions on telephone lines connected to the switch; a groupware environment such as Lotus Notes for enabling a business application to be executed on the workstations; and a business application for execution within said groupware environment. The groupware environment having a Java Virtual Machine and a Java Applet Interface for enabling the execution of Java applets within the application independent of the groupware environment. The business application comprises a telephony applet embedded within a presentation layer which can communicate directly with the telephony server independent of the groupware environment.

1 Claim, 4 Drawing Sheets

JAVA ENABLED GROUPWARE

FIELD OF INVENTION

This invention relates to the java enabling of groupware applications and, in particular, to enabling groupware to perform telephony functions in a call centre telephony environment.

BACKGROUND OF INVENTION

Call centres are now an important part of the business function of most large companies. In many cases customers are, in the first instance, forwarded to a call centre before being forwarded to the relevant company representative or agent. This enables the call to be forwarded more efficiently. Information can be collected from the customer without using an agent, for instance using an interactive voice response system, thereby saving agent time and increasing efficiency.

The purpose of a call centre is to enable a customer call to be dealt with by one of a number of representatives or agents having access to the relevant business application. A customer could be calling for any one of a number of reasons, for instance, requiring further information, making a simple or detailed enquiry, placing an order, following up an order, needing basic technical assistance or making a payment. Each one of these reasons for calling may have a business application associated with it and any representative having access to the business application should be able to deal with the call. A company may have a dedicated department to deal with one of these functions or have a department which deals with more than one function.

Business applications are generally stand alone and are not integrated with telephony functions. This requires the agent to enter information about a call or caller directly into the application while the caller is talking to the agent and means that the agent will use the separate telephone system to handle the call. This can lead to inefficiencies when handling the call, for instance having to manually dial the customer number and enter in the customer details.

In order to overcome some of these inefficiencies, business applications are increasingly being integrated with telephony functions so that the agent may select on his workstation a customer to dial and the workstation will instruct the relevant hardware to make the call.

For instance, it is known to include in a business application 100 on a workstation client 102 a function (such as make a telephone call) which will make an application interface (API) call to a telephony server 104 (see FIG. 1A) in order to initiate a telephone call. The telephony server 104 is connected to a telephony system and comprises telephony functionality 106 for making a call. The client server architecture is enabled using a common telephony interface 108A, 108B.

One of the problems with this known approach is that for a telephony function to be included in such a business application the application developer needs to be competent with programming both the business application and the telephony functionality.

Business applications are increasingly being written in a groupware environment which allows a company to give its business applications a common interface to its employees. Groupware business applications have a similar look and feel and therefore can be much easier to learn and use than stand alone business applications. Typically a non-programming employee can set up a document database using template forms stored in the groupware environment and allow access to the database through the groupware environment to other employees.

The internet can be considered a groupware environment where web pages are the interfaces to business applications. A telephony directory business application can be telephony enabled on the internet using a web page 110 (see FIG. 1B). On selecting a person to call from a list on the directory web page and submitting the web page to the internet server 112, a telephony connection can be set up between the caller and the selected person. Initially a client computer 114 connected to the internet uses a browser to access the telephone directory web page 110 stored on the internet server 112. The caller's telephone and password are entered in appropriate fields in the page and the person to be called is selected from a list in another field. The web page is submitted to the internet server 112 by selecting the appropriate button. The internet server 112 acquires the information from the web page 110 and then makes a telephony API call to a telephony server 116 connected to the internet server 112 to make the call. The telephony server 116 s connected to a private branch exchange and may set up telephone calls between telephones connected to the PBX. The telephony server receives the call through a common telephony interface and using the appropriate telephony functionality makes a telephone connection between the parties.

This solution suffers from a similar problem as the previous telephony enabled business application. In order to write such an application it is necessary to use low level code for the business application and for the telephony functionality and have an application developer familiar with both.

It would be desirable to incorporate telephony functionality in an existing groupware business applications without having to program the telephony functions in a low level.

SUMMARY OF INVENTION

According to a first aspect of the invention there is provided a system for operating a call centre comprising: telephony means for performing a plurality of telephony functions with respect to the call centre; a groupware environment and business application for execution within said groupware environment, said groupware having applet means for enabling the execution of applets within the application but independent of the groupware environment; the application comprising a telephony applet for controlling the telephony means; and the business application comprising: a document template into which the applet is embedded; and means for creating a new document from a document template; wherein the new document comprises the same applet that is embedded in the document template.

By embedding telephony applets in existing groupware applications, telephony functionality can be extended to call centres with relatively small effort. Groupware is particularly useful for designing business applications and databases at a high level (not language specific) and the addition of telephony applets into the design process great improve the efficiency of using groupware in a call centre environment. The telephony means corresponds to a telephony-server including a common interface with the groupware. The applet means corresponds to the Java Virtual Machine including the interfaces necessary for executing the applet.

A telephony applet preferably comprises a self contained telephony object or line resource object for invoking any one of the telephone functions of the telephony server on a telephone line connected to the call centre. The line resource object comes in the form of a Java Bean so that it may be assembled into an applet by a visual builder such as Visual Age for Java.

The groupware may comprise a presentation layer which the user will see. It may also comprise functionality for designing a business application within this presentation layer, in Lotus Notes for example, 'forms' are part of the presentation layer which the user will see and can tailor to suit. The groupware may import a telephony applet into the presentation layer and embed it within the Notes form. The importation can occur after the business application has been designed.

In Lotus Notes the 'business application' comprises a document template (Notes form) into which the applet is embedded and functionality for creating an instance of a new document from a document template. Each new document therefore comprises the same applet that is embedded in the document template.

According to another aspect of the present invention there is provided a method of operating a call centre comprising: executing a business-application within a groupware environment on a call centre workstation; opening an applet embedded within the business application; performing, independently of said groupware environment, a telephony function provided by the applet with respect to a telephony line connected to the call centre.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1A:
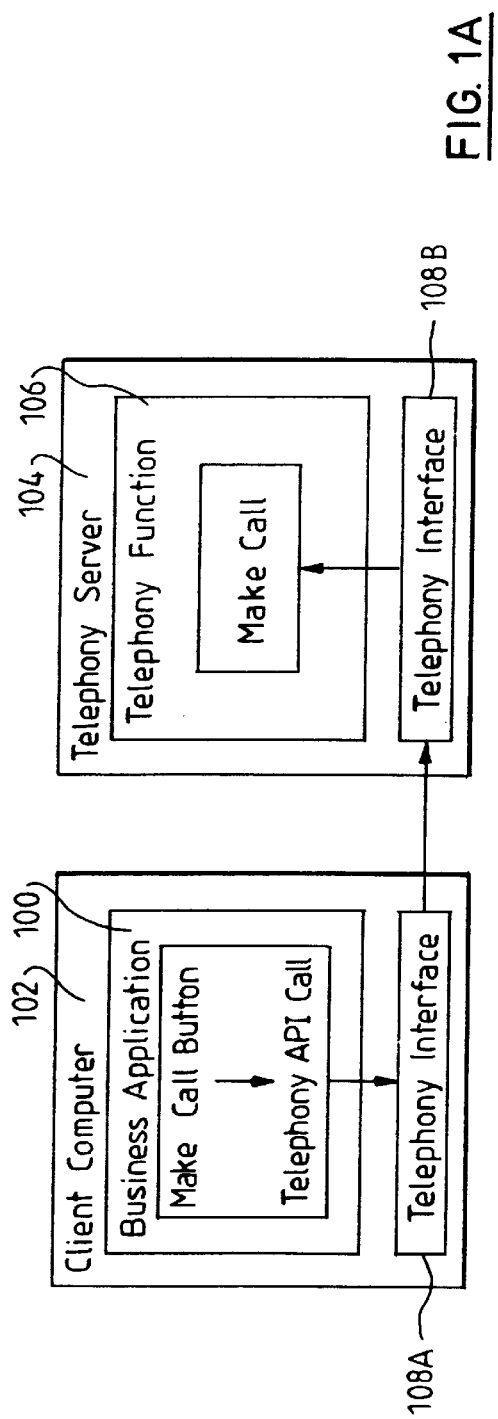
FIGS. 1A and 1B are schematic representations of prior art telephony enabled business applications.
Figure 1B:
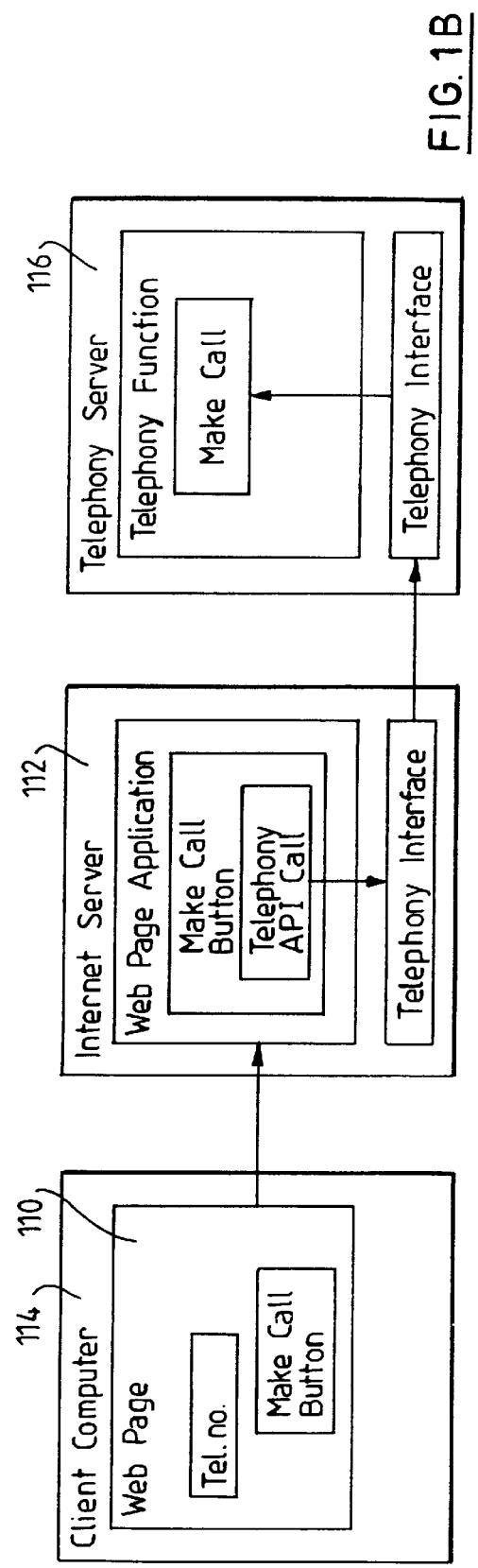
Figure 2:
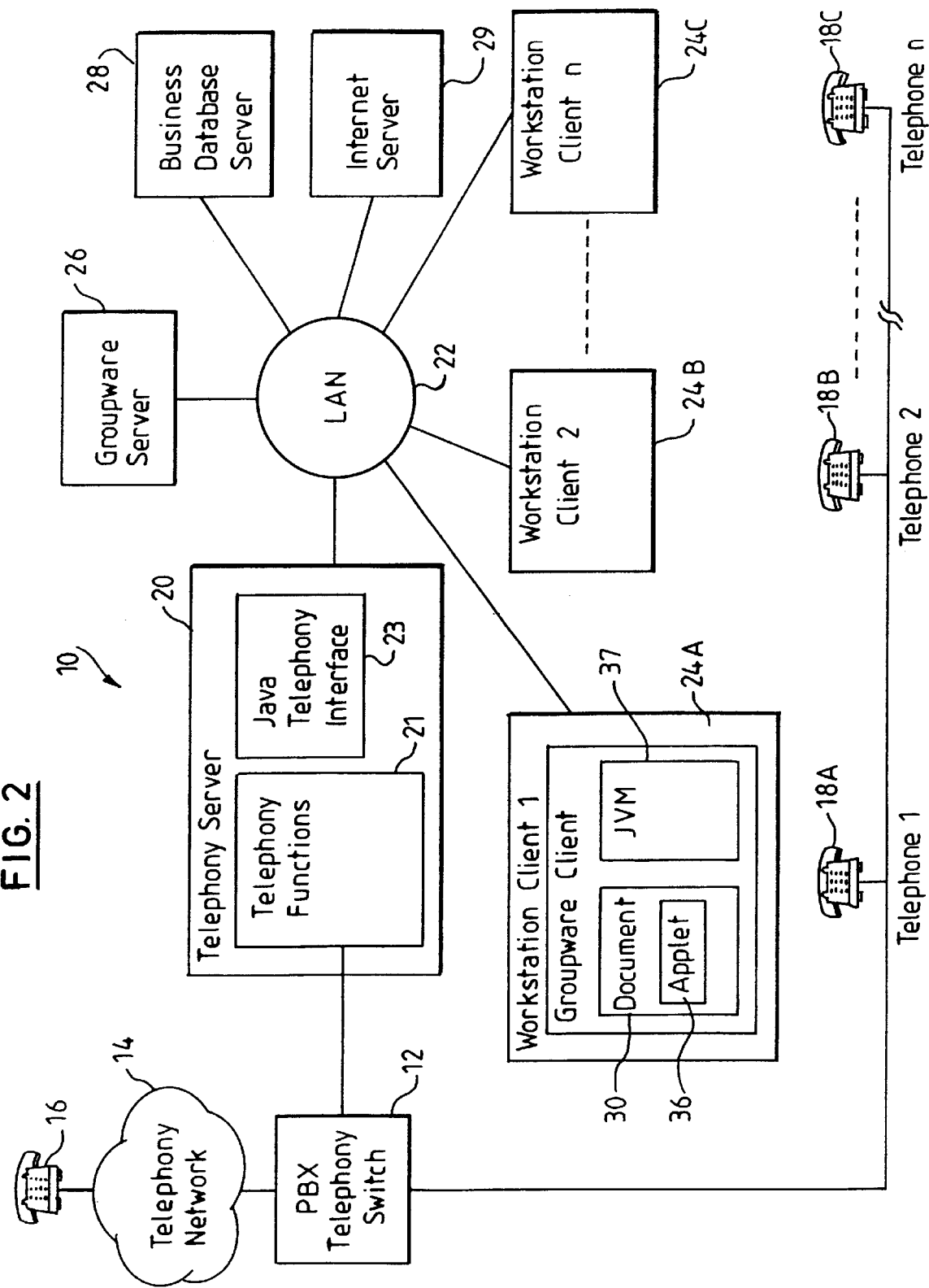
FIG. 2 is a schematic representation of a call centre including the telephony enabled groupware environment.

Referring to FIG. 2 there is shown a call centre 10 on which the present embodiment of the invention resides. A telephony switch or private branch switch (PBX) 12 is connected to a telephony network 14 to make telephone connections from the call centre 10 to an external party's telephone 16 connected to the telephony network 14 and also to accept telephone calls made to the call centre 10. Connected to the switch 12 are agent telephones 18A, 18B and 18C over which telephony connections are made. Further connected to the telephony switch 12 is a telephone server 20 for interfacing between the telephony system and the computer system. The server 20 receives network information about an incoming call (for example the telephone number of the external caller) and also sends messages to the switch 14 to instruct the switch to perform telephony functions such as making or breaking telephone connections, transferring calls and setting up conference calls. The telephony server 20 is in turn connected to a local area network (LAN) 22 which allows other servers and clients to communicate with the telephony server 20 and receive and transmit telephony messages to the telephony switch 12.

Connected to the LAN 22 are agent workstations 24A, 24B and 24C corresponding to agent telephones 18A, 18B and 18C. A workstation 24A allows its agent to access the telephony functions of the switch 12. For example, by selecting a particular customer on a business application database running on the workstation, a telephony connection can be made between the agent telephone 18A and the external telephone 16 of the customer. Also, an external call from a customer using telephone 16 could be identified by a workstation, say 24B although normally the workstation of any available agent would be used. Using the telephone number acquired from the telephony network, the workstation 24B may execute a business application with customer records corresponding to the acquired telephone number. In this latter case the external call would be forwarded to the telephone 18B corresponding to the workstation 24B.

Further connected to the LAN 22 is a groupware server 26 containing the main components of the groupware environment such as the groupware databases, business applications and groupware functionality.

Also connected to the LAN 22 is a business database server 28 for containing data that is not part of the groupware environment.

An internet server 29 is also connected to the LAN 22 to provide a gateway onto the internet for email and world wide web pages. An email database is a business application using the internet.

In the preferred embodiment the groupware environment is implemented by Lotus Notes v4.6 groupware, so that the workstation clients are Notes clients and the groupware server is a Notes server. Lotus Notes is a database orientated groupware which stores its databases centrally on a server and allows access to the databases by the clients. Many business applications involve using some sort of database for their processing and Lotus Notes provides template databases for a variety of applications, for instance a customer database. A user many create a database by selecting a template and creating an instance of it in the groupware environment. A database in Notes comprises a collection of documents 30, in the example of a customer database, each customer would have a document associated with his name in the database (see FIG. 3). The look of each document is dictated by a form as each document 30 is an instance of the database form, the form is essentially a template for each document 30.

Also in the preferred embodiment telephone functionality 21 is provided by IBM CallPath Services Architecture. This provides a switch mapping protocol for the telephony switch, a subsystem to provide the underlying services necessary to support the telephony requests for the switch and messages received from the switch, and an application programming interface (API) to 10 access the subsystem. Most importantly, CallPath includes a Java Telephony Interface (JTAPI) 23 which maps onto the CallPath API and allows Java applications to use the CallPath functionality.

IBM's CallPath is particularly useful because telephony functions written in Java already exist. For example, IBM's CallPAth Telephony Beans (released in December 1997—see UK Patent Application GB9719942.6). Using the CallPath Telephony Beans, Java applications can be written to control telephones from a desktop, including functions such as making a telephone call, reacting to the arrival of a telephone call and retrieving information about a call. Java Beans are Java components written in a way which enables them to be used in a visual programming environment such as IBM's VisualAge. Beans may or may not have a visual representation on a form.

In order to embed an applet 36 into a Notes document 30, it is necessary to have a form comprising an embedded applet 31. This is not a difficult step but requires access to design functionality within Notes. The form then acts as a template for future documents. As part of the design process, there is the option to embed an applet, including specifying the screen size to be allocated to the applet, the source of the applet code, and any parameters of the form to be made available to the applet (indicated by the document data layer in FIG. 3). Typically the applet is first created outside Lotus Notes using a suitable development tool such as VisualAge for Java and then imported into the Notes environment. Notes v4.6 allows Java applets to be embedded in documents. These Java applets are executed in a Java Virtual Machine 37 that is part of the Notes environment. The groupware supports independent mini applications (applets) 36 that are not directly part of the groupware environment. This allows servers independent of the groupware to be accessed and used if security provisions allow.

Figure 3:
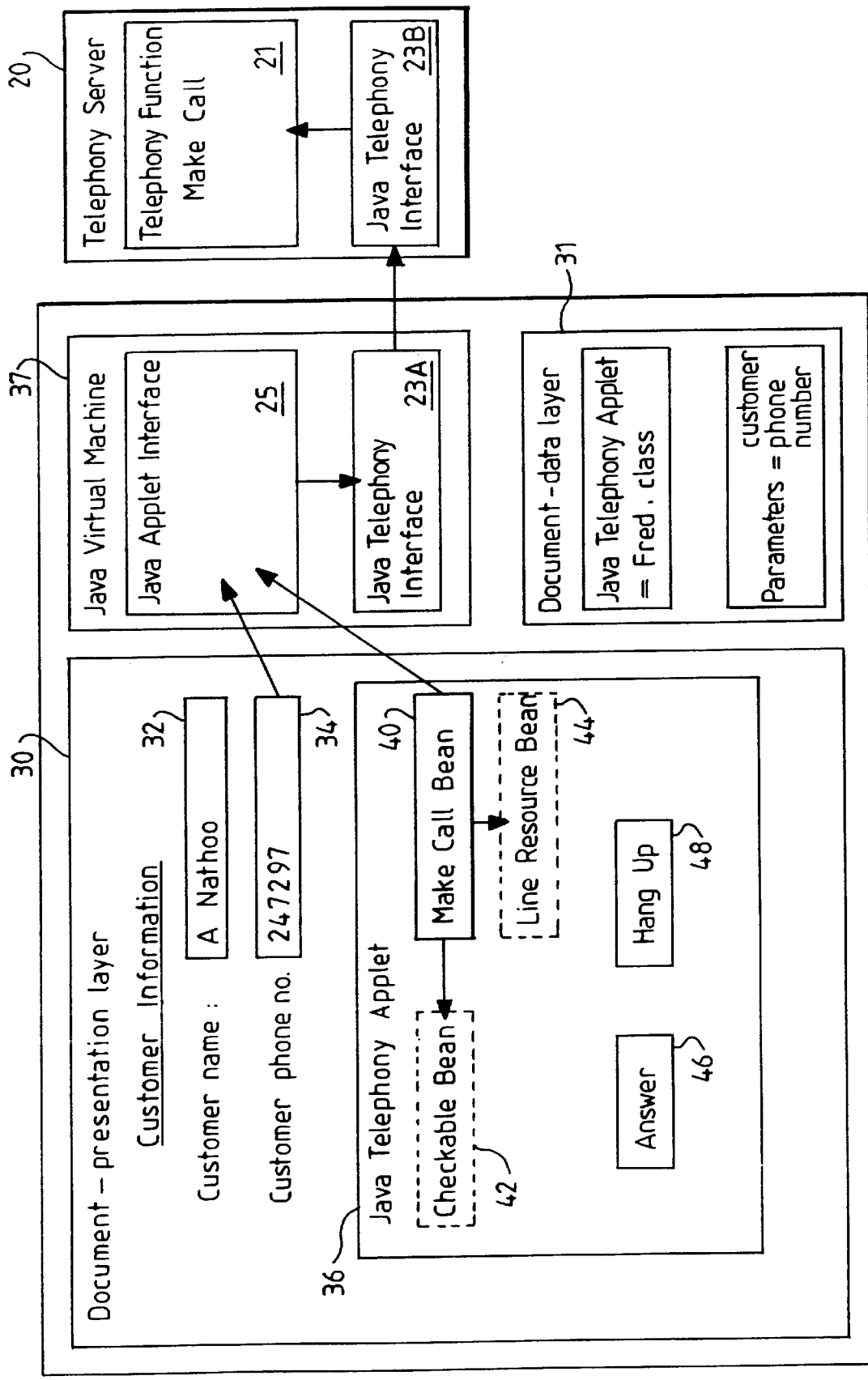
FIG. 3 is a schematic representation of a business application document which has been telephony enabled according to the present embodiment.

The JVM 37 comprises two useful interfaces: the Java Applet Interface 25 and the Java Telephony Interface 23A, 23B (see FIG. 3). The Java Applet Interface 25 allows a Java program or applet 36 to be embedded into a form as an object. The Java Applet Interface 25 allows the applet to access fields within the form. For instance a web browser has a Java Applet Interface 25 which passes parameters from the web page to the applet. The Java Applet Interface 25 has been adapted for Lotus Notes so that parameters contained within a customer name field may be passed to the applet for processing. A Java Telephony Interface 23A in Notes allows the applet to communicate with the telephony server through the telephony server's Java Telephony Interface 23B.

Referring to FIG. 3 there is shown a Notes document 30 created from a Notes form, the document is part of a collection of documents in a customer database in the Notes environment. The document comprises a customer name field 32 (showing 'A Nathoo'), a customer phone number field 34 (showing ('247297') and a Java Telephony Applet 36. The Java telephony applet is constructed in a visual programming environment and imported into a Notes from a Notes design environment. When a new document is created from the form, Notes embeds the applet in the new document. A document data layer 38 is created in the design stage and holds information pertaining to the Java Telephony Applet and parameters that it may access. In this case the Java Telephony Applet can access the Customer phone Number field 34 in order to make a telephone call.

The Java Telephony Applet 36 comprises a Make Call Bean 40 attached to a Check Number Bean 42 and a Line Resource Bean 44. The Make Call Bean 40 is a visual bean which displays itself as a button. On selecting this button, the user will initiate a 'Make Call' function. The Check Number Bean 42 checks that the number that the Make Call Bean is using to make the call is valid, this bean is not a visual bean. The Line Resource Bean 44 provides the communication with the telephony functionality on the Telephony Server 20, this bean is not a visual bean. The Line resource beans are described more fully in the above referenced UK patent application.

Another bean in the applet is an Answer Bean 46 which is used to answer an incoming customer call that has invoked the customer document. The other bean in FIG. 3 is the Hang Up Bean 48 which is used to terminate a call. Both these latter beans use the Line Resource Bean 44.

Figure 4:
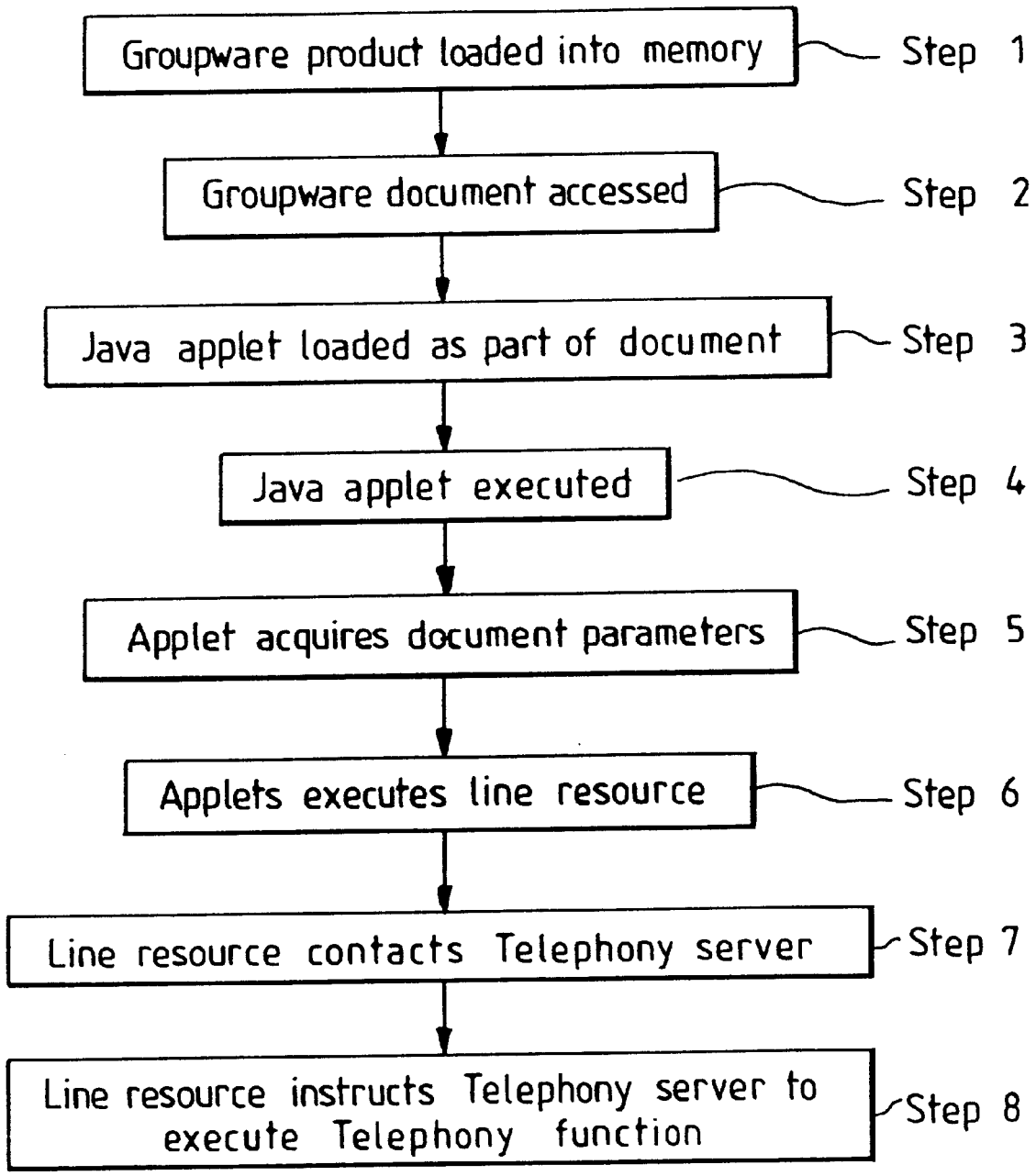
FIG. 4 is a flow diagram of the process of accessing the telephony functionality using the telephony enabled groupware of the present embodiment.

In operation (see FIG. 4), selecting the Make Call Bean 40 within the applet 36 of the document 30 starts the process of making a telephone call to the customer referred to by the document 30.

Step 1) Load up a client groupware product (eg Notes) into memory of the workstation 24;

Step 2) Access a document 30 within the groupware environment;

Step 3) Java applet interface 25 loads applet 36 which contains a visual dial button Java Make Call Bean 40 and a invisible Line Resource Bean 44 within document;

Step 4) User selects dial button and the Java Bean 40 executes;

Step 5) Make Call Bean 40 acquires parameters (such as a destination telephone number 34 in a list) from document 30 using the Java Applet Interface;

Step 6) Make Call Bean 40 activates Line Resource Bean 44 and passes over the telephone number parameter 34;

Step 7) Line Resource Bean 44 contacts the telephony server 20 (Line Resource Beans contains all the information about the location of the server and location of dialling phone and password and user id) (via CallPath Java Interface);

Step 8) Line Resource Bean 44 receives acknowledgement from server 20 and Line Resource Bean 44 instructs telephony server to dial number (via CallPath Java Interface), The Check Number Bean 42 in the embedded applet in the form/document takes information from document via the Java Applet Interface, manipulates it and puts it back into the document 30. For instance, the customer document 30 contains a telephone number 34 and the Make Call Bean 40 acquires the telephone number and attempts to make outbound call using it. The Make Call Bean 40 fails because number is invalid and calls the Check Number Bean 42 which checks the number and updates the document. The Check Number Bean 42 can check the number format for common errors eg the '+' before a country code, missing or extra zeros for country codes.

Although the embodiment has been described using Lotus Notes groupware, the invention could be implemented on any groupware product that supports groupware independent applets. The embodiment has been described using a customer database as an example but it would be clear to a person skilled in the art that the invention may be applied to many different types of business applications involving a database. Databases for customer orders, customer invoices, product availability amongst other things could be linked to a customer database and telephony enabled in a similar way. Furthermore the embodiment has been described using IBM's CallPath call centre software. However any call centre software providing the telephony functions described and having a common Telephony Interface a groupware environment would be suitable.

Other beans may be used in a document but are not shown in the figures. A 'Transfer Call Bean'—pops up window with list of people that deal with customer and to which a call may be transferred. A 'Conference Call Bean'—pops up a list of people that deal with customer, used for instance with customer complaints. A 'Statistics Beans'—collects information from call (at the same time as the call) and puts information back into the document.

Lotus Notes is a trademark of Lotus Corporation. CallPath and VisualAge are trademarks of IBM Corporation.

In summary there is described a system for operating a call centre comprising workstations and corresponding telephones connected to a telephony private branch switch. The system comprising: a telephony server, connected between the workstations and the telephony switch, for performing telephony functions on telephone lines connected to the switch; a groupware environment such as Lotus Notes for enabling a business application to be executed on the workstations; and a business application for execution within said groupware environment. The groupware environment having a Java Virtual Machine and a Java Applet Interface for enabling the execution of Java applets within the application independent of the groupware environment. The business application comprises a telephony applet embedded within a presentation layer which can communicate directly with the telephony server independent of the groupware environment.

Now that the invention has been described by way of a preferred embodiment, various modifications and improvements will occur to those person skilled in the art. Therefore it should be understood that the preferred embodiment has been provided as an example and not as a limitation.

What is claimed is:

1. A system for operating a call centre comprising:

telephony means for performing a plurality of telephony functions with respect to the call centre;

a groupware environment and a business applet for execution within said groupware environment, said groupware having applet means for enabling the execution of applets within the application but independent of the groupware environment;

the application comprising a telephony applet for controlling the telephony means; wherein said applet comprises a self contained telephony object for invoking any one of the telephone functions of the telephony means on a telephone line connected to the call centre;

and the groupware comprises a presentation layer; a means for designing a business application within the presentation layer; and means for importing the telephony applet into the presentation layer; whereby said telephony apple may be imported into the business application after the business application has been designed; and the business application comprising: a document template into which the applet is embedded; and means for creating a new document from a document template; wherein each new document comprises the same applet that is embedded in the document template.

* * * * *